(12) United States Patent
Wu et al.

(10) Patent No.: US 7,696,984 B2
(45) Date of Patent: Apr. 13, 2010

(54) MINIATURIZED OPTICAL MOUSE CORE

(75) Inventors: Rong Yaw Wu, Hsin Tien (TW); Shih Che Chen, Hsin-Tien (TW); Shu Ying Chang, Hsin-Tien (TW)

(73) Assignee: Pixon Technologies Corp., Taipei (TW)

( * ) Notice: Subject to any disclaimer, the term of this patent is extended or adjusted under 35 U.S.C. 154(b) by 1246 days.

(21) Appl. No.: 11/152,169

(22) Filed: Jun. 15, 2005

(65) Prior Publication Data
US 2006/0284845 A1 Dec. 21, 2006

(51) Int. Cl.
G09G 5/00 (2006.01)
G09G 5/08 (2006.01)
G06F 3/033 (2006.01)

(52) U.S. Cl. ........................ 345/166; 345/158
(58) Field of Classification Search ......... 345/156–158, 345/163, 166
See application file for complete search history.

(56) References Cited

U.S. PATENT DOCUMENTS 7,019,733 B2* 3/2006 Koay ........................ 345/163
7,439,954 B2* 10/2008 Theytaz et al. .............. 345/156
2005/0093825 A1* 5/2005 Chang et al. ................ 345/166
2006/0256086 A1* 11/2006 Xie et al. .................... 345/166

* cited by examiner

Primary Examiner—Alexander S. Beck
(74) Attorney, Agent, or Firm—Chun-Ming Shih

(57) ABSTRACT

An optical mouse system with a high-angle optical path features small size and low power consumption. The illumination source and optical sensor are mounted in the same plane, directly on the PCB. The higher angle of the optical path causes more light to be reflected to the optical sensor, increasing optical efficiency and allowing a smaller, lower powered LED to be used. This also results in increased sensitivity of the optical sensor, allowing use of the mouse on surfaces on which conventional optical mice cannot function adequately. Sensitivity can be further increased by optional isolation of the optical sensor and illumination source. Lower power usage increases battery life for mobile or wireless-mouse use, while reducing thermal waste considerations. This allows the creation of a significantly smaller form factor for the overall package, thereby reducing materials costs and giving designers more flexibility for external design considerations.

10 Claims, 10 Drawing Sheets

MINIATURIZED OPTICAL MOUSE CORE

BACKGROUND OF THE INVENTION

1. Field of the Invention

The present invention relates to optics. More specifically, the present invention discloses an optical system for sensing motion of a surface relative to the optical system.

2. Description of the Prior Art

Traditionally, the optical computer mouse uses a light-emitting diode (LED) to graze a surface with illuminating light, and detects patterns in reflected light from the surface to compute motion. Please refer to FIG. 1a, a diagram of a prior-art optical computer mouse 100. Externally, the mouse has a housing 101 and a base plate 102. Internal to the housing, a printed-circuit board (PCB) 110 has a light-emitting diode 140 (LED) and optical sensor 150 mounted to it. The LED 140 emits light, a light beam 170 of which is focused and guided through an illumination guide 130. The illumination guide 130 typically extends through a hole in the PCB 110. The light beam 170 enters the illumination guide 130 through a first flat surface 1311, is reflected off a first reflector 1301, is reflected off a second reflector 1302, and exits the illumination guide 130 through a second flat surface 1312. The light beam 170 exits the mouse body through an aperture 107 in the base plate 102, reflects off a reference surface 10, and reenters the illumination guide 130 through a third flat surface 1313. The light beam 170 shines onto an optical sensor 150, which detects patterns in the reference surface 10 revealed by the light. These patterns may be caused by roughness in the reference surface 10, or may be caused by colorations of the surface 10. Referring to FIG. 1b, the angle 20 between the light beam 170 and the reference surface 10 is acute and is typically less than about twenty degrees and greater than about five degrees from the plane of the reference surface. The angle 70 between the light beam 170 and a normal 90 to the reference surface 10 is thus typically about seventy degrees or greater.

However, this low angle causes most of the light emitted by the LED to be scattered to the sides, thereby being lost to the sensor. The LED 140 must therefore be of high intensity, consuming a large amount of power, which is then wasted on generating the lost light, and which also creates heat dissipation issues. Furthermore, this requires the LED 140 and other components to be correspondingly large, increasing the size of the mouse. In addition to increasing materials costs, this creates a lower limit on the attainable size of the mouse. Moreover, the structure of this design places the LED 140 and the optical sensor 150 in different planes, and requires cuts in the PCB 110, thereby further increasing the design complexity of the mouse, and also increasing the required size.

In addition, the structure of the prior art mouse is typically open internally, and in many cases transparent materials are used for the housing 101 and base plate 102 for aesthetic considerations, thereby allowing external light not generated by the mouse 100 to reach the optical sensor 150, and internally, allowing randomly scattered light from the LED 140 to reach the optical sensor 150. This undesirable light can only serve to interfere with the imaging performed by the optical sensor 150.

Therefore there is need for an improved optical system for the mouse which will allow smaller overall size and lower power consumption while also reducing design complexity.

SUMMARY OF THE INVENTION

To achieve these and other advantages and in order to overcome the disadvantages of the conventional method in accordance with the purpose of the invention as embodied and broadly described herein, the present invention provides an optical mouse system that directs illumination at a surface from an angle of typically less than about thirty-three degrees in respect to a 90 degree angle from the surface, thereby increasing the optical efficiency of the system and reducing power requirements, and also thereby increasing the sensitivity of the system to the relative movement of the reference surface, and also thereby shrinking size requirements.

The present invention further provides an optical mouse system in which the illumination source is mounted on the same surface or plane as the optical sensor, thereby simplifying construction and shrinking size requirements.

The present invention further provides an optical mouse system in which the optical sensor may optionally be substantially isolated from extraneous light, both that which is generated by the mouse and that which is foreign to the system, thereby increasing the sensitivity of the system to the relative movement of the reference surface.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
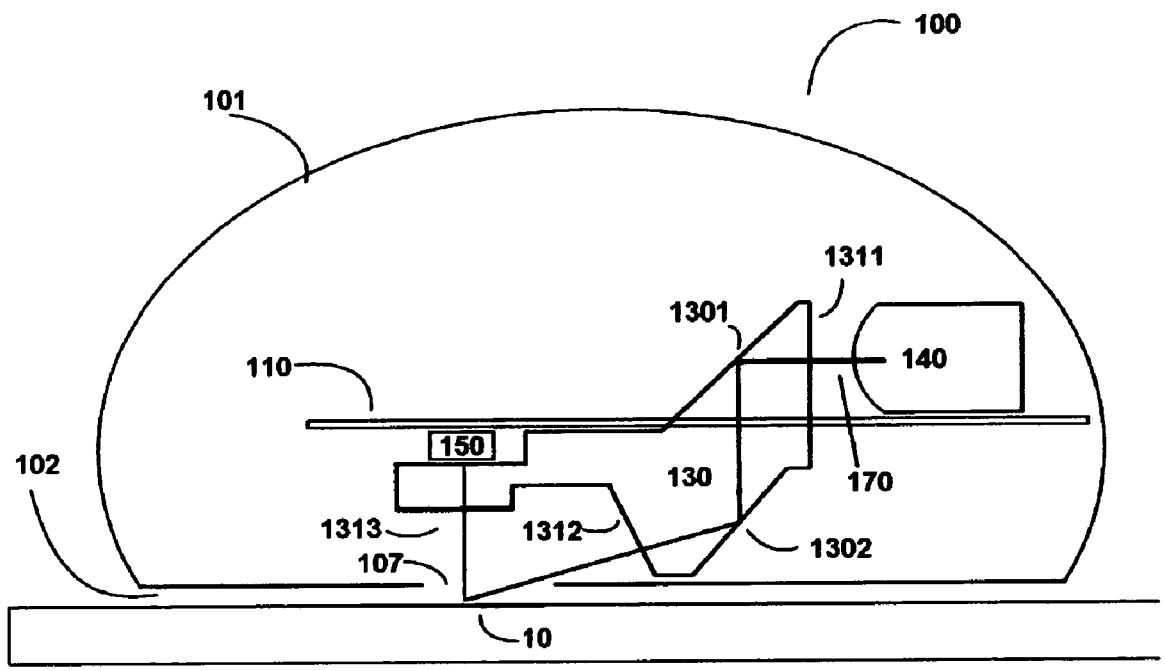
FIG. 1a is a diagram showing a cross section of a prior art optical computer mouse.
Figure 1B:
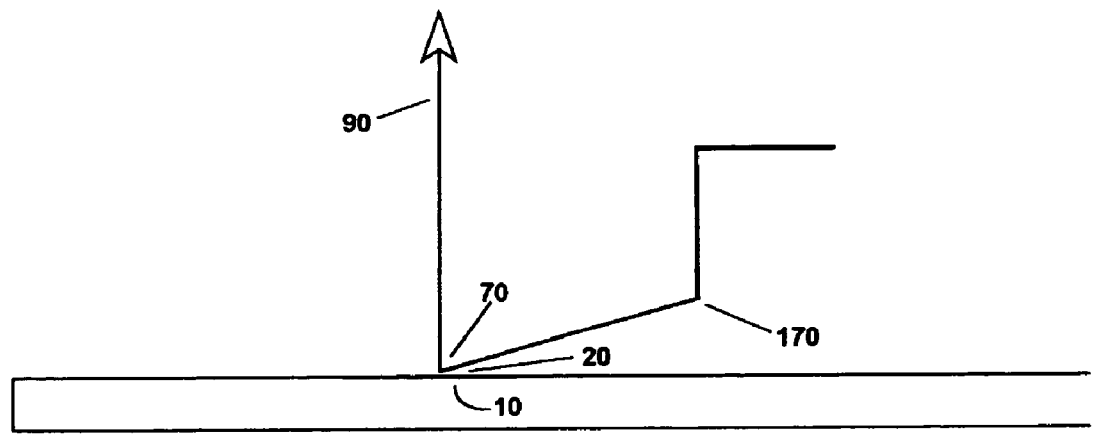
FIG. 1b is a diagram illustrating the path of a light beam generated by a prior art mouse.

Reference will now be made in detail to the preferred embodiments of the present invention, examples of which are illustrated in the accompanying drawings. Wherever possible, the same reference numbers are used in the drawings and the description to refer to the same or like parts.

Figure 2A:
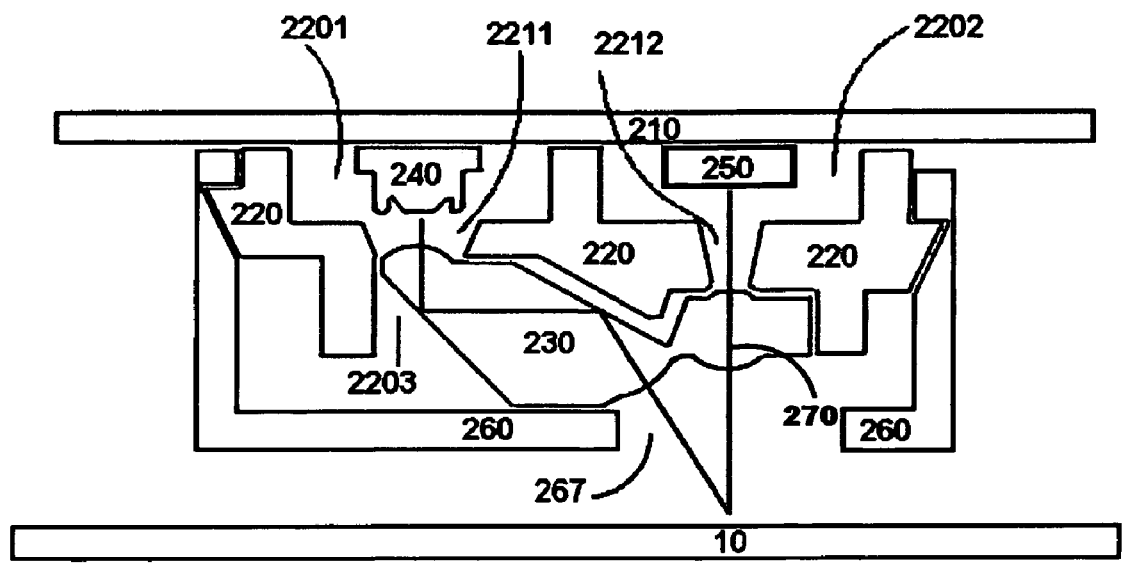
FIG. 2a is a sectional diagram illustrating the preferred embodiment of the internal components of an optical computer mouse of the present invention.

Please refer to FIG. 2a, which shows a cross-section diagram of the internal components of the preferred embodiment of an optical computer mouse of the present invention. (The cross-section traverses the exit aperture 2211 and entry aperture 2212, thereby causing the holder 220 to appear as if in three pieces. This section is the same as used in FIG. 4c, and is marked as the section A-A in FIG. 6c.) An illumination source 240 and an optical sensor 250 are mounted on a printed-circuit board (PCB) 210. The illumination source 240 and the optical sensor 250 are mounted on a plane parallel to the surface of the PCB 210, on which the electronic components are mounted. The illumination source 240 is typically a light-emitting diode (LED) in the SMD form factor, but the present invention may also use an infrared-emitting diode, a laser diode, or other suitable illuminating radiation emission source matched to the type of illumination that the optical sensor 250 can receive. A holder 220 is disposed over and around the illumination source 240, such that the holder 220 in combination with the PCB 210 isolates the illumination source 240 inside a source cavity 2201 so that the illumination it generates can only exit through an exit aperture 2211. Likewise, the holder 220 is disposed over and around the optical sensor 250, such that the holder 220 in combination with the PCB 210 surrounds the optical sensor 250, isolating the optical sensor 250 inside a sensor cavity 2202 so that the illumination the optical sensor 250 receives can only enter through an entry aperture 2212. An illumination guide 230 rests in an illumination guide cavity 2203 of the holder 220, retained securely in place by a clip 260. (The retaining arrangement of the preferred embodiment is discussed in more detail below.) The clip 260 has a main aperture 267 through which the illumination exits, reflects off a reference surface 10, and re-enters the optical computer mouse.

Figure 2B:
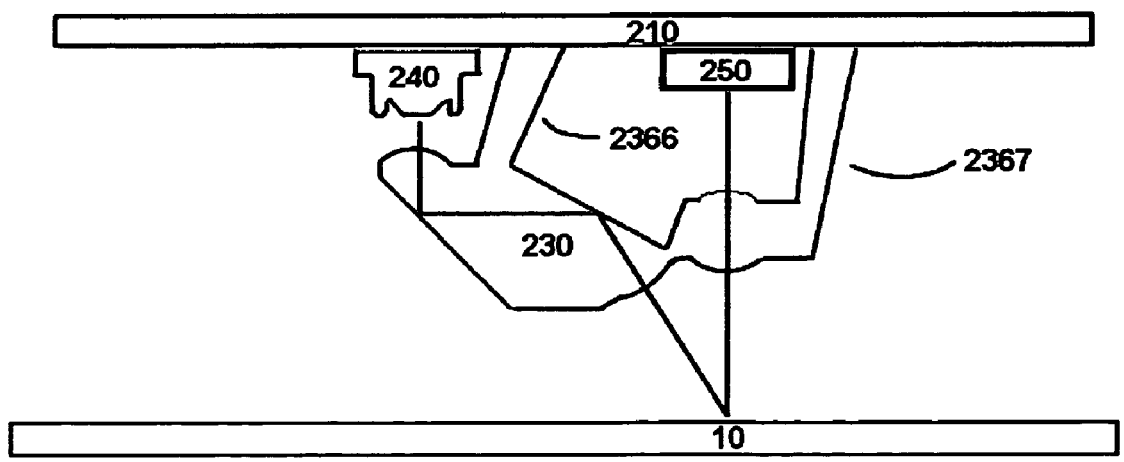
FIG. 2b is a sectional diagram illustrating a second embodiment of the internal components of an optical computer mouse of the present invention.

Referring now to FIG. 2b, which shows a cross-section diagram of the internal components of a second embodiment of an optical computer mouse of the present invention, this embodiment differs from the preferred embodiment in that it does not use a holder to isolate the illumination source 240 from the optical sensor 250. The illumination guide may be held to the PCB 210 by a clip (not shown) or integrated fingers 2366~2367, or it may be attached to the housing (not shown) or the housing base (not shown), or it may be an integral part of the housing base (not shown).

Figure 3A:
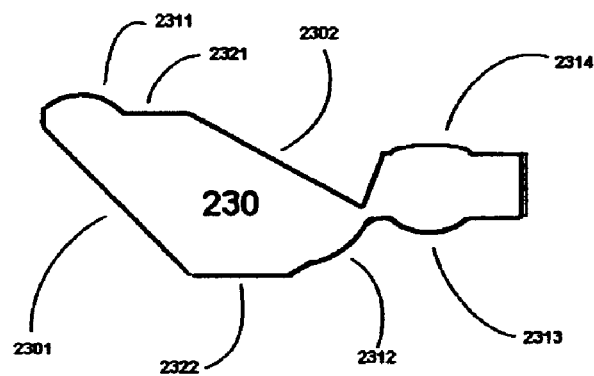
FIG. 3a is a detail diagram illustrating an embodiment of an illumination guide for an embodiment of an optical computer mouse of the present invention.

Please refer to FIG. 3a, which is a diagram illustrating an embodiment of an illumination guide for the preferred embodiment of an optical computer mouse of the present invention, with reference to FIG. 2a and FIG. 2b. The preferred embodiment's illumination guide 230 has a first reflector 2301 and a second reflector 2302. The preferred embodiment's illumination guide 230 further comprises a first lens 2311, a second lens 2312, a third lens 2313, and a fourth lens 2314. The preferred embodiment's illumination guide 230 further has a first mating surface 2321 and a second mating surface 2322. The illumination guide 230 may be made of polymer, glass, or other refractive material which is substantially transparent to the wavelength of the illumination being used. Optically, the illumination beam 270 is emitted from the illumination source 240, enters the illumination guide 230 through the first lens 2311, is reflected from the first reflector 2301, is reflected from the second reflector 2302, and exits the illumination guide 230 through the second lens 2312 at an angle of, for example, less than about thirty-three degrees from a 90 degree angle to the reference surface. Optionally, to spread the illumination beam 270 more evenly, the first lens 2311 and second lens 2312 may be textured, for example by stippling or otherwise hazing their surfaces. Optionally, to spread the scattered illumination from the reference surface 10 to the optical sensor 250 for the purpose of removing detail from the image formed on the optical sensor 250, the third lens 2313 may be textured. Please note that the first lens 2311, the second lens 2312, the third lens 2313, and/or the fourth lens may be flat surfaces in some embodiments.

In the preferred embodiment, the angle is thirty-two degrees from the normal. Note this angle can be adjusted according to design. It is understood that this angle is intended to be measured when the optical mouse is flat against a substantially planar reference surface, although in typical use the mouse may be picked up, turned, or used on an irregular surface in such a way that at times the angle varies substantially; such usage may result in a temporary loss of tracking.

Continuing with discussion of FIG. 3a, the illumination is scattered from the reference surface and re-enters the illumination guide 230 through the third lens 2313, and travels through the illumination guide 230 to the fourth lens 2314, where the illumination beam 270 then exits the illumination guide 230 to fall onto the optical sensor 250.

Figure 3B:
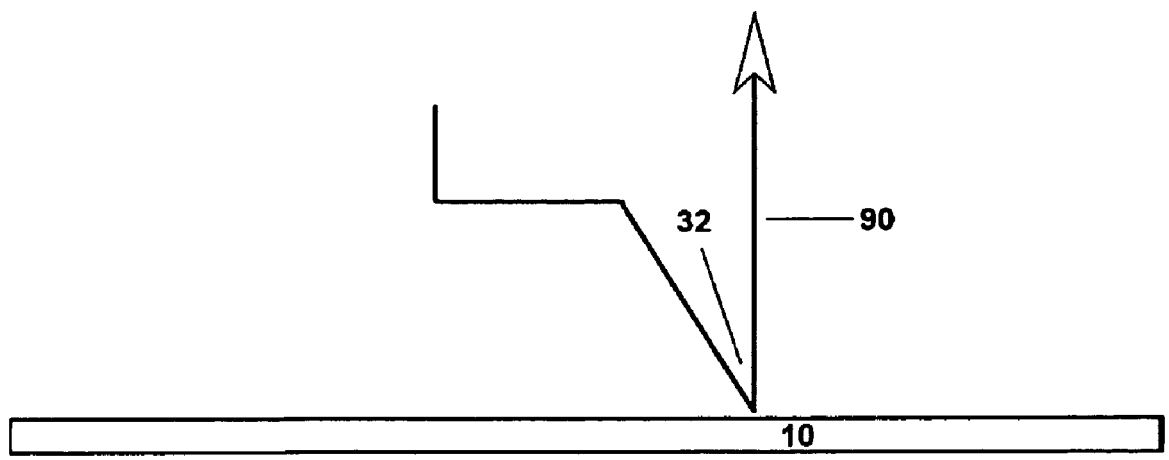
FIG. 3b is a diagram illustrating the path of an illumination beam generated by an embodiment of an optical computer mouse of the present invention.

The illumination path of the preferred embodiment and the second embodiment is shown in FIG. 3b. The illumination exits the illumination guide (not shown) such that it reaches the reference surface 10 at an angle 32 less than about thirty-three degrees from a normal 90 to the reference surface 10. The optical sensor (not shown) receives illumination that has been scattered at an angle substantially near the normal 90 to the reference surface 10. Referring to FIG. 3a in combination with FIG. 3b, it should be noted that it is possible to alter the angles of the first reflector 2301 and second reflector 2302 relative to each other while still generating an illumination beam 270 that reaches the reference surface 10 at a substantially similar angle 32.

Figure 4A:
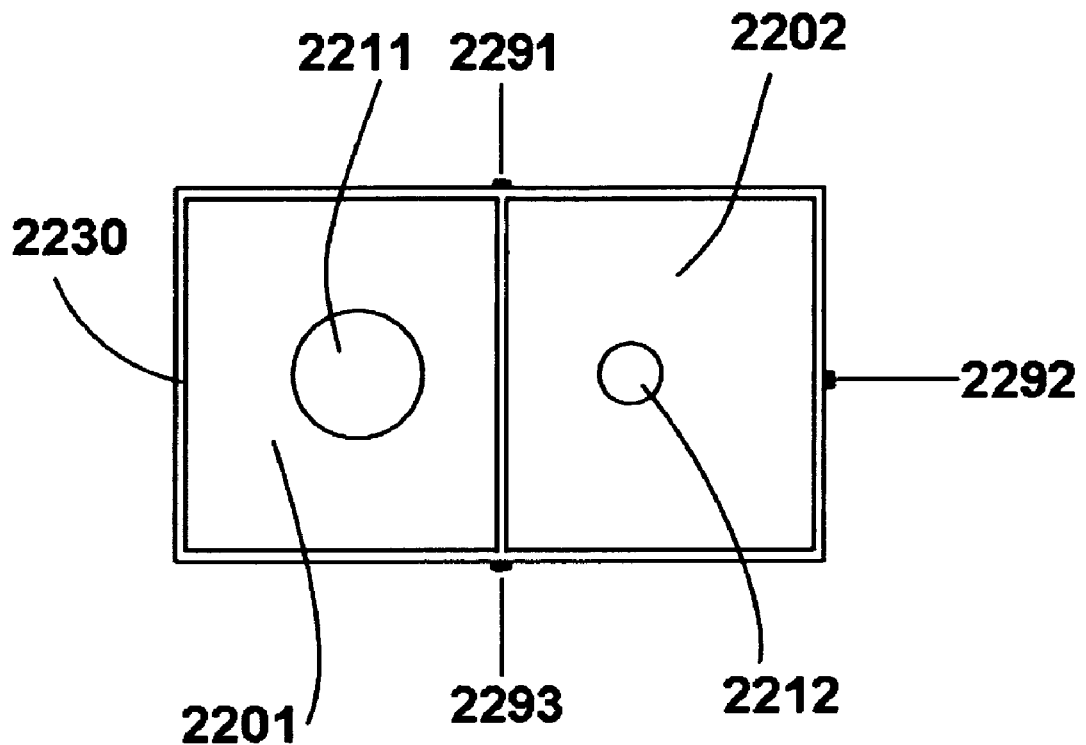
FIG. 4a is a top view of a holder for an embodiment of an optical mouse of the present invention.
Figure 4B:
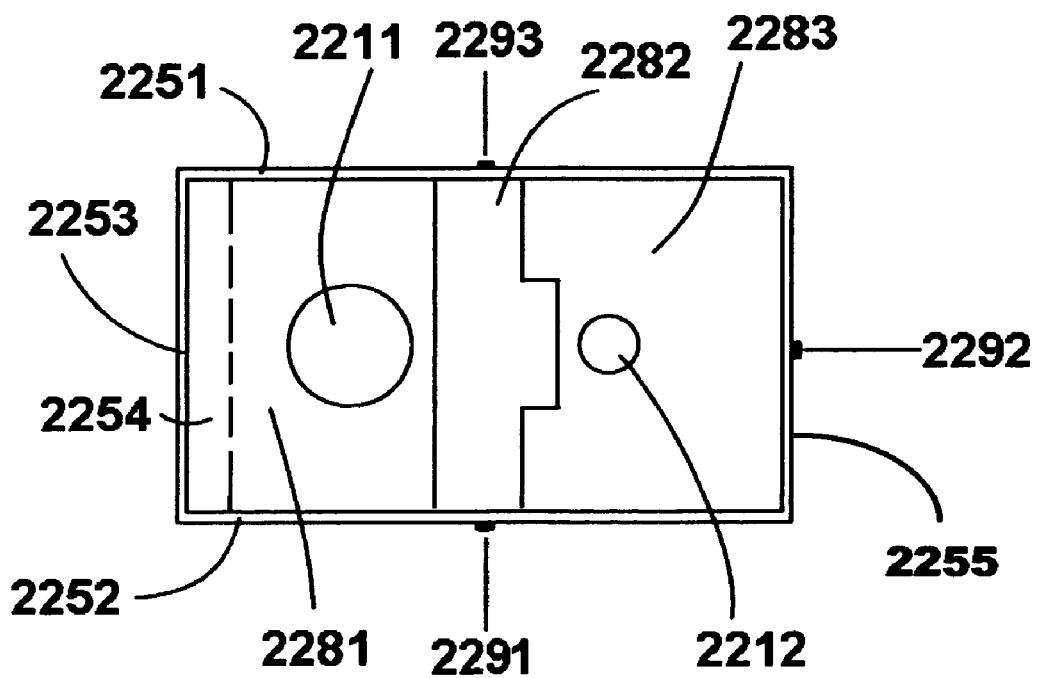
FIG. 4b is a bottom view of a holder for an embodiment of an optical mouse of the present invention.
Figure 4C:
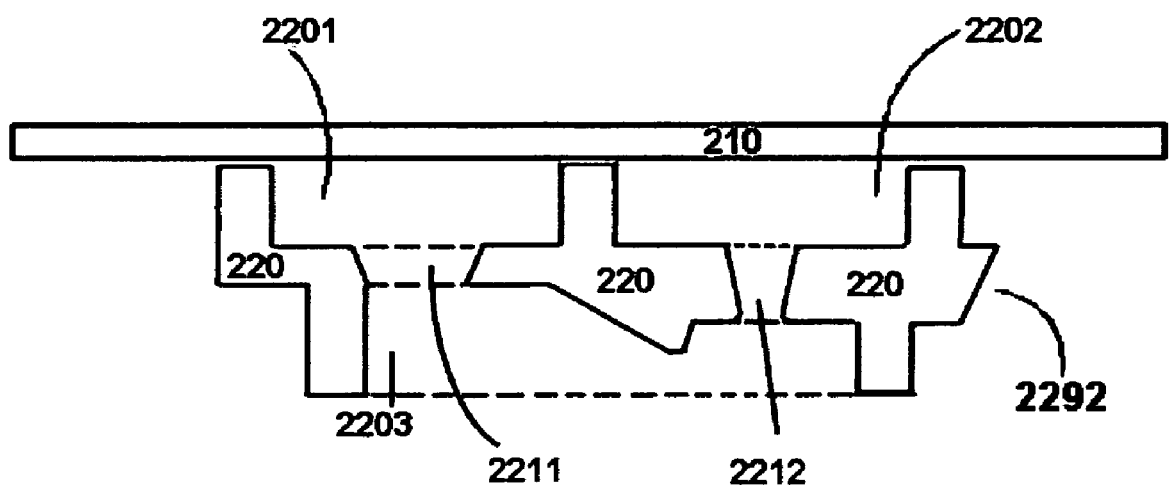
FIG. 4c is a cross-section view of a holder for an embodiment of an optical mouse of the present invention.

Please refer to FIG. 4a, FIG. 4b, and FIG. 4c, which show three views of the holder 220 used in an embodiment of an optical mouse of the present invention. FIG. 4a shows a top view of the holder 220. The holder 220 has a source cavity 2201 which surrounds the illumination source 240, and a sensor cavity 2202 which surrounds the optical sensor 250.

The source cavity 2201 has an exit aperture 2211 through which illumination from the illumination source 240 exits the source cavity 2201 and enters the illumination guide (see FIG. 2a). The sensor cavity 2202 has an entry aperture 2212 through which illumination can reach the optical sensor 250. Along the outer perimeter, three ears 2291~2293 which hook into three tabs 2601~2603 (not shown, see FIG. 6b) on the clip 260 (not shown, see FIG. 6b) for holding the overall assembly together are visible. FIG. 4a also shows an outline of the PCB-side surface 2230 of the holder 220 where it contacts the PCB 210. The holder thus isolates the illumination source 240 from the optical sensor 250, providing only a single exit path for the illumination that the illumination source 240 emits, said exit path being through the exit aperture 2211. The holder further provides only a single entry path through which illumination can reach the optical sensor 250, said entry path being through the entry aperture 2212. The holder is typically made of a material which absorbs the illumination generated by the illumination source 240, such as a textured (e.g., stippled or otherwise made nonreflective) black polymer, thereby reducing any illumination scattered by internal reflections.

FIG. 4b shows a view of the illumination guide cavity 2203 surface of the holder 220. This surface is shaped to fit the contours of the illumination guide 230, capturing the illumination guide 230 into its designed position and orientation and supporting it. From this viewpoint, looking down into the cavity, the area 2281 surrounding the exit aperture 2211 is lower than the area 2283 surrounding the entry aperture 2212. Please refer to FIG. 4b in combination with FIG. 3a, a diagram showing a cross section of the illumination guide 230. The middle area 2282 slopes at the same angle as the second reflector 2302 of the illumination guide 230 and a small wedge forms to one side where this middle area 2282 rises above the area 2281. The upper exit surface 2314 of the illumination guide 230 fits against the area 2283, and the first mating surface 2321 fits against the area 2281. This orients and supports the illumination guide 230 from the holder surface. Additionally, the sides of the illumination guide 230 are substantially flat and parallel planar surfaces (not shown). These fit neatly between the two long walls 2251~2252 of the illumination guide cavity 2203. The short wall 2253 of the illumination guide cavity 2203 may optionally have an overhanging shelf 2254 to capture the end of the illumination guide 230. The second short wall 2255 of the illumination guide cavity 2203 fits against the opposite end of the illumination guide 230. Thus the illumination guide 230 is supported on all sides and underneath, holding the illumination guide 230 in its proper orientation.

Figure 6A:
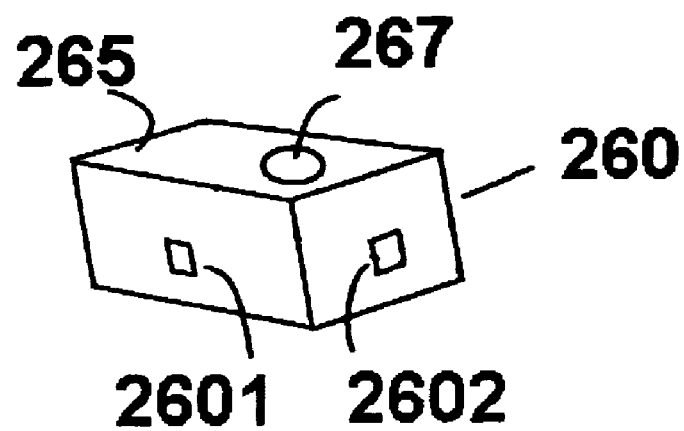
FIG. 6a is a perspective drawing of an embodiment of a clip for an embodiment of an optical computer mouse of the present invention.
Figure 6B:
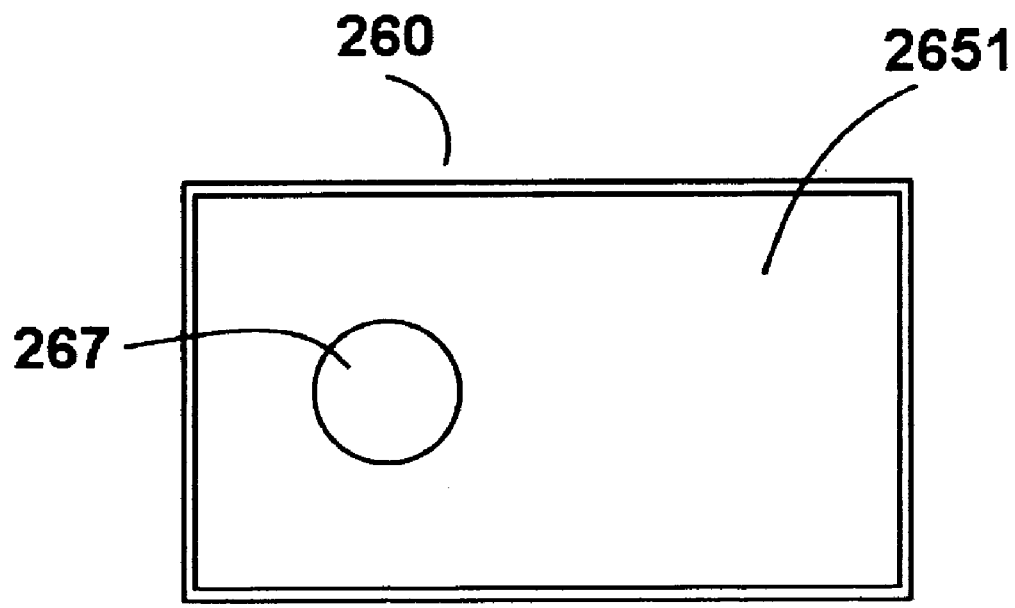
FIG. 6b is an internal view of an embodiment of a clip for an embodiment of an optical computer mouse of the present invention.
Figure 6C:
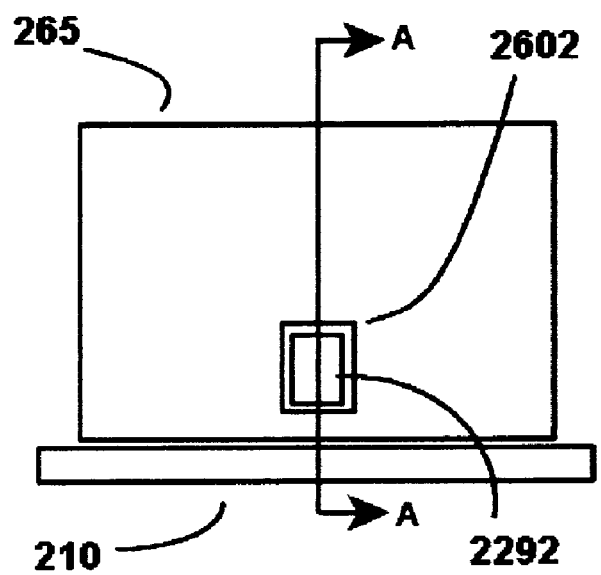
FIG. 6c is an end view of an embodiment of the clip for an optical computer mouse of the present invention.

FIG. 4c shows a cross-section of the holder 220 and the PCB 210 through the line A-A of FIG. 6c. The cross-section shows the exit aperture 2211 and the entry aperture 2212, the contour of the illumination guide cavity 2203 (through the center, including the wedge), the source cavity 2201, the sensor cavity 2202, and one ear 2292 of the three ears. The cross-section traverses both the exit aperture 2211 and entry aperture 2212 (shown with dashed lines) thereby causing the holder 220 to appear as if in three pieces. Note that this section is the same as used in FIG. 2a.

Figure 5:
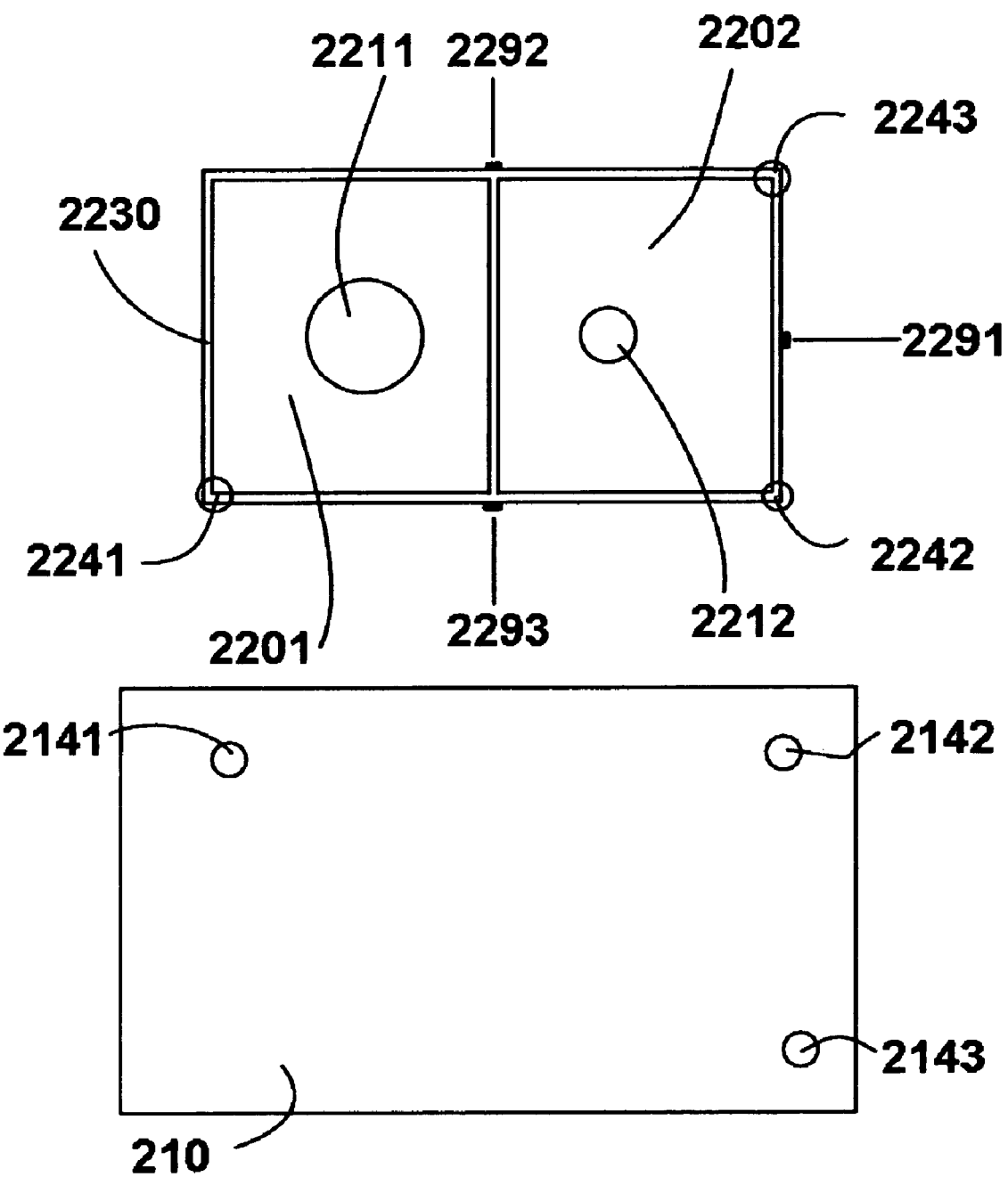
FIG. 5 is a diagram of an alternate embodiment of a holder for an embodiment of an optical mouse of the present invention.

Please refer to FIG. 5, which shows an alternative embodiment of the holder 220 which, in addition to the other features already described, further comprises locating pins 2241~2243 molded to project from the surface of the holder which is proximal to the PCB 210. These locating pins 2241~2243 are inserted into matching locating holes 2141~2143 in the PCB 210, and the locating pins 2241~2243 are then softened and flattened against the rear surface of the PCB 210 during final assembly, after the illumination source 240 and optical sensor 250 (as well as any other electronic components) are mounted to the PCB 210, to mount the holder permanently in place on the PCB. The locating pins 2241~2243 are designed in an asymmetrical pattern to orient the holder 220 correctly so that the holder 220 cannot be improperly positioned during assembly.

Please refer to FIG. 6a, which is a perspective drawing of an embodiment of a clip for an embodiment of an optical computer mouse of the present invention. The clip 260 has a distal surface 265 with a main aperture 267. The distal surface 265 is substantially flat. Tab 2601 and tab 2602 are visible from this angle; tab 2603 is on the long face to the back and right. In the preferred embodiment the clip 260 has three tabs 2601~2603 which lock over three ears 2291~2293 on the holder 220 shown in FIG. 4a and FIG. 4b. The tabs 2601~2603 and ears 2291~2293 are oriented asymmetrically so that the parts can only fit together in one orientation during assembly. This helps to ensure that the main aperture 267 ends up being located correctly over the illumination guide 230 (see FIG. 2a).

Referring now to FIG. 6b, which is an internal view of an embodiment of a clip for an embodiment of an optical computer mouse of the present invention, The interior surface 2651 of the distal surface 265 (not shown) presses against the second mating surface of the illumination guide 230 (not shown), locking the illumination guide 230 (not shown) into place against the holder 220 (not shown) in the illumination guide cavity 2203 (not shown). This completes the assembly of the optical mouse core.

Please see FIG. 6c, an end view of the preferred embodiment of the clip for an optical computer mouse of the present invention. The tab 2602 is centered from side to side in the face, and is near the edge proximal to the PCB 210. Visible inside the tab 2602 is the ear 2292 of the holder 2200. The distal surface 265 is at the top of this diagram. Section line A-A marks the section shown in FIG. 2a and FIG. 4c.

Figure 6D:
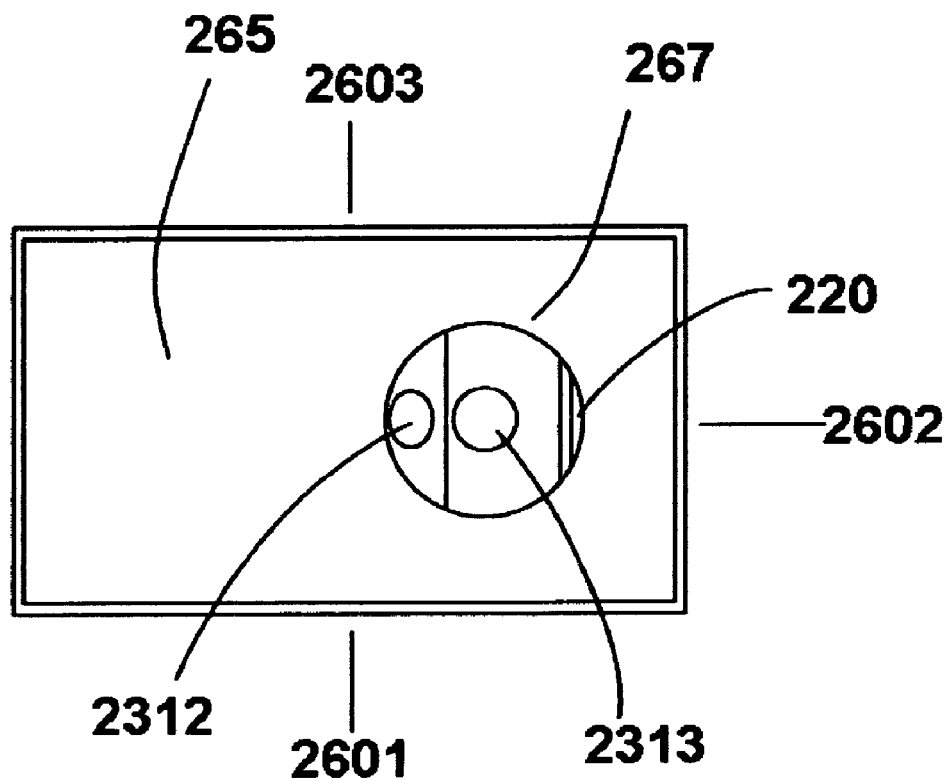
FIG. 6d is a bottom view of the assembled optical mouse core.

Please see FIG. 6d, a bottom view of the assembled optical mouse core. The main aperture 267 is visible on the distal surface 265 of the clip 260. The second lens 2312 and third lens 2313 of the illumination guide 230 and an edge of the holder 220 are visible within the main aperture 267. The second lens 2312 and third lens 2313 are positioned so that the path of the illumination beam (not shown) exits the second lens 2313, exits the main aperture 267, scatters off the reference surface (not shown), and re-enters the main aperture 267 to enter the third lens 2313. Positions of the tabs 2601~2603 are marked but are not directly visible in this drawing.

Figure 7:
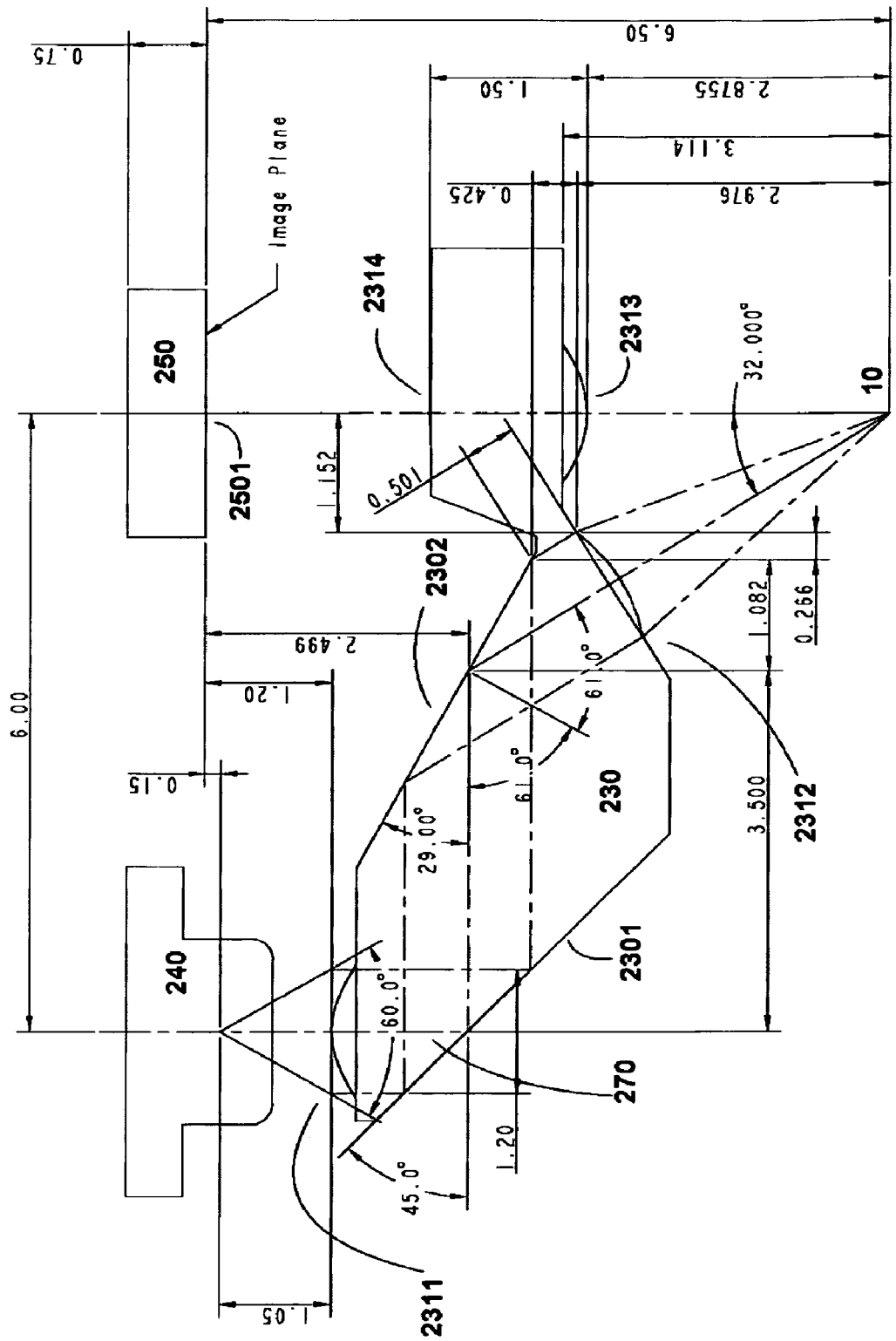
FIG. 7 is a detailed diagram of the preferred embodiment of an illumination guide for the embodiment an optical mouse of the present invention.
Figure 8:
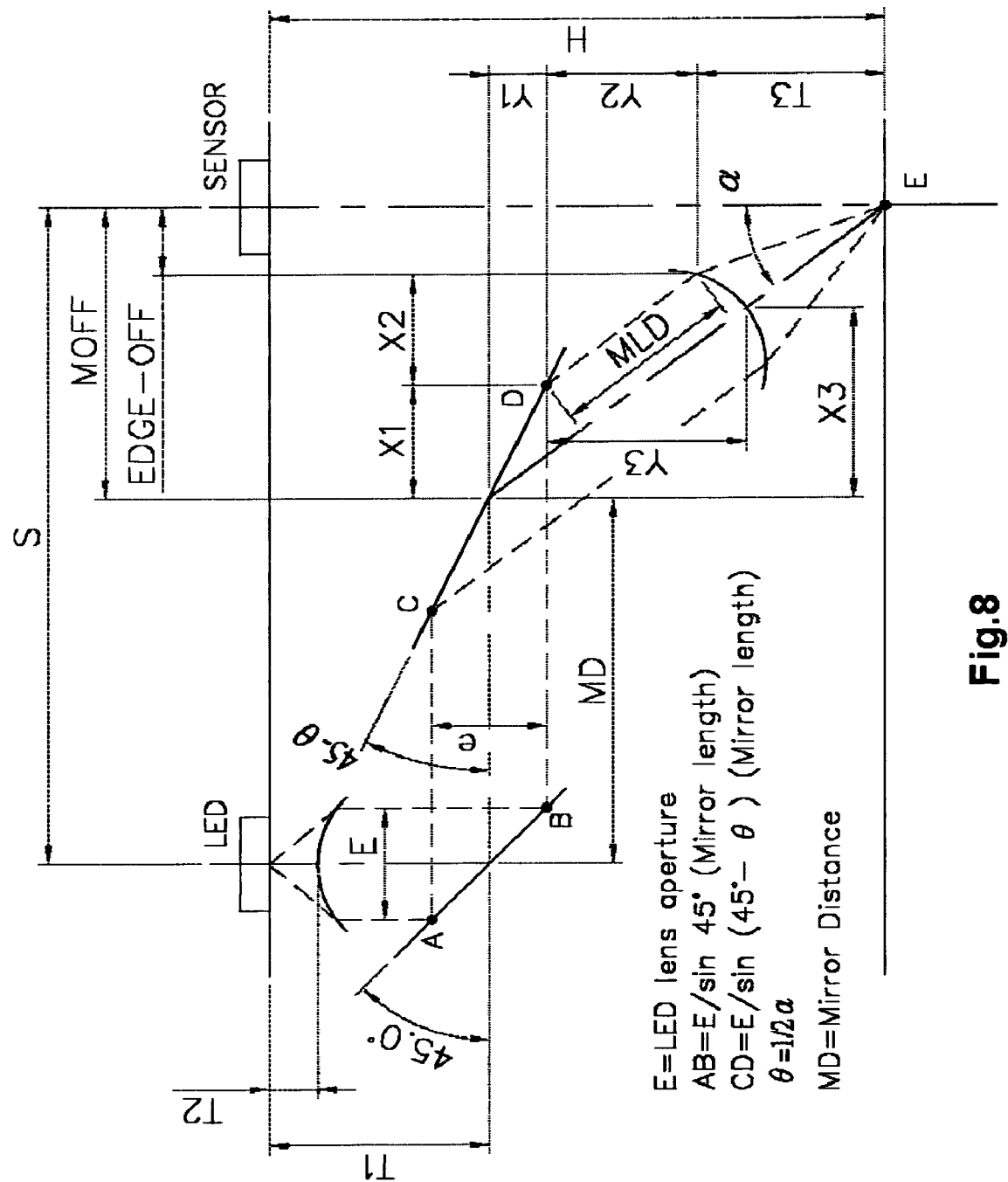
FIG. 8 is a ray-trace diagram of the preferred embodiment of the illumination guide for the embodiment of an optical mouse the present invention.

Please refer to FIG. 7, which is a detailed drawing of the lens system of the illumination guide of the present invention and to FIG. 8, which shows the mathematical relationships of the optics. The illumination source 240 illuminates the first lens 2311 of the illumination guide 230 with about sixty degrees of its output. The first lens 2311 is designed with the correct focal length to collimate this illumination into an illumination beam 270. Any illumination which is moving in other directions is scattered or absorbed by the holder 220 (not shown), which is preferably made of a black nonreflective material such as a polymer. The first reflector 2301 and second reflector 2302 reflect the illumination beam 270 through the second lens 2312, which spreads the illumination beam 270 substantially to illuminate the reference surface 10 through the main aperture (not shown). Illumination which is scattered from the reference surface 10 re-enters the illumination guide 230 through the third lens 2313, travels through the illumination guide 230, exits through the fourth lens 2314, and falls on the image plane 2501 of the optical sensor 250.

The required length of the first reflector 2301 is the width of the exit aperture 2211 divided by the sine of forty-five degrees. The required length of the second reflector 2302 is the width 'e', here identical to the width of the exit aperture 2211 (since the first reflector 2301 was selected to be at a forty-five degree angle) divided by the sine of the quantity forty-five degrees minus half the angle of incidence from the normal, chosen to be thirty-two degrees in the preferred embodiment; this simplifies to the sine of twenty-nine degrees.

This optical mouse system thus provides a substantial improvement over the prior art by reducing power usage and materials costs, and by simplifying the internal construction of the optical mouse core. Isolation of the illumination source from the optical sensor, and of the optical sensor from external illumination, helps to increase sensitivity of the system. Furthermore, its smaller form factor gives designers more flexibility in housing design.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An optical mouse system comprising:
    a printed circuit board, having at least a first surface on which components are mounted;
    an illumination source where an axis of the illumination source is parallel to a vector normal to the first surface of the printed circuit board;
    a sensor, having a sensing surface comprising an array of sensing elements, where a vector normal to the sensing surface is parallel to a vector normal to the first surface of the printed circuit board;
    an illumination guide, for directing illumination from the illumination source to a reference surface at an angle of less than about thirty-three degrees from a normal vector to said reference surface when said reference surface is parallel to the first surface of the printed circuit board, and for redirecting scattered illumination from said reference surface toward the sensing surface of the sensor, said illumination guide comprising a first mating surface and a second mating surface;
    a holder, having a first surface and a second surface, comprising:
        an illumination source cavity, formed into the first surface of the holder, having an illumination exit aperture, and shaped to fit over the illumination source;
        a sensor cavity, formed into the first surface of the holder, having an illumination entry aperture, and shaped to fit over the sensor; and
        an illumination guide cavity, formed into the second surface of the holder, and having a guide surface shaped to fit against the first mating surface of the illumination guide;
    where the first surface of the holder is disposed against the first surface of the printed circuit board; and
    a containing clip, comprising:
        an aperture through which illumination is directed and redirected;
        a cavity, shaped to fit around the holder and the illumination guide, comprising an internal surface shaped to fit against the second mating surface of the illumination guide and the second surface of the holder such that the first mating surface of the illumination guide is held against the guide surface of the illumination guide cavity of the holder; and
        a clip for attaching the containing clip either to the holder or to the printed circuit board;
    where the containing clip encloses the holder and illumination guide and shields the sensor from external ambient illumination.

2. The optical mouse system of claim 1 where the containing clip and holder are made of nonreflective black polymer.

3. The optical mouse system of claim 1 where the holder further comprises a plurality of fingers extending from the first surface, and where the printed circuit board comprises a plurality of holes, such that the sizes and shapes of the holes of the printed circuit board match the sizes and shapes of the plurality of fingers extending from the first surface of the holder.

4. The optical mouse system of claim 1 where the illumination guide further comprises a first reflector and a second reflector.

5. The optical mouse system of claim 4 where the first reflector is disposed at an angle substantially near forty-five degrees from a vector to the illumination source, and where the second reflector is disposed at an angle substantially near twenty-nine degrees from a reflection of the vector from the first reflector.

6. The optical mouse system of claim 4 where the illumination guide further comprises:
    a first lens on a surface proximal to the holder and with an optical axis of the first lens centered in the illumination exit aperture, for collimating illumination emitted by the illumination source into an illumination beam;
    a second lens disposed on a source exit surface and with an optical axis of the second lens centered in the illumination beam after the illumination beam reflects from the first reflector and then reflects from the second reflector, for spreading the illumination beam to illuminate the reference surface; and
    a third lens disposed on an illumination entry surface and with an optical axis of the third lens centered on a vector from a center of the sensing surface through a center of the illumination entry aperture of the holder, for focusing illumination scattered from the reference surface onto the sensing surface.

7. The optical mouse system of claim 6, further comprising:
    a fourth lens disposed on the illumination guide where the illumination beam exits the illumination guide to fall onto the optical sensor.

8. The optical mouse system of claim 7 where the illumination guide further comprises texturing on a surface of the first lens, a surface of the second lens, a surface of the third lens, and a surface of the fourth lens to spread the illumination beam.

9. The optical mouse system of claim 1 further comprising a housing having a bottom surface shaped to move against the reference surface and a top surface, said housing containing the holder, the illumination guide, the clip, the printed circuit board, the illumination source, and the sensor within the housing.

10. The optical mouse system of claim 1 where the illumination source comprises a light-emitting diode (LED), an infrared-emitting diode (IRED), or a laser diode (LD).

* * * * *